United States Patent
Shkurko et al.

(10) Patent No.: US 11,854,139 B2
(45) Date of Patent: Dec. 26, 2023

(54) GRAPHICS PROCESSING UNIT TRAVERSAL ENGINE

(71) Applicant: ADVANCED MICRO DEVICES, INC., Santa Clara, CA (US)

(72) Inventors: Konstantin Igorevich Shkurko, Santa Clara, CA (US); Michael Mantor, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/564,160

(22) Filed: Dec. 28, 2021

(65) Prior Publication Data
US 2023/0206543 A1   Jun. 29, 2023

(51) Int. Cl.
| | |
|---|---|
| *G06T 15/06* | (2011.01) |
| *G06T 15/08* | (2011.01) |
| *G06F 9/48* | (2006.01) |
| *G06T 17/10* | (2006.01) |
| *G06T 1/20* | (2006.01) |
| *G06T 15/00* | (2011.01) |

(52) U.S. Cl.
CPC ............ *G06T 15/06* (2013.01); *G06F 9/4881* (2013.01); *G06T 1/20* (2013.01); *G06T 15/005* (2013.01); *G06T 15/08* (2013.01); *G06T 17/10* (2013.01)

(58) Field of Classification Search
CPC ......... G06T 15/06; G06T 15/005; G06T 1/20; G06T 15/80; G06T 17/005; G06T 2210/12; G06T 2210/61; G06T 15/04; G06T 17/00
See application file for complete search history.

(56) References Cited

U.S. PATENT DOCUMENTS

| | | | |
|---|---|---|---|
| 9,460,546 B1 | 10/2016 | Stich et al. | |
| 2014/0362074 A1 | 12/2014 | Karras et al. | |
| 2016/0110910 A1 | 4/2016 | Obert et al. | |
| 2019/0057539 A1* | 2/2019 | Stanard | G06T 17/005 |
| 2021/0287419 A1 | 9/2021 | Liktor et al. | |
| 2022/0051467 A1* | 2/2022 | Woop | G06T 1/60 |

OTHER PUBLICATIONS

International Search Report and Written Opinion issued in Application No. PCT/US2022/053493, dated Apr. 21, 2023, 10 pages.
Meister et al. "A Survey on Bounding Volume Hierarchies for Ray Tracing," Computer Graphics Forum, vol. 40, No. 2, 2021, 683-712, 29 pages.

* cited by examiner

*Primary Examiner* — Hau H Nguyen (57) ABSTRACT

A processing unit employs a hardware traversal engine to traverse an acceleration structure such as a ray tracing structure. The hardware traversal engine includes one or more memory modules to store state information and other data used for the structure traversal, and control logic to execute a traversal process based on the stored data and based on received information indicating a source node of the acceleration structure to be used for the traversal process. By employing a hardware traversal engine, the processing unit is able to execute the traversal process more quickly and efficiently, conserving processing resources and improving overall processing efficiency.

18 Claims, 5 Drawing Sheets

GRAPHICS PROCESSING UNIT TRAVERSAL ENGINE

BACKGROUND

To improve the fidelity and quality of generated images, some software, and associated hardware, implement ray tracing operations, wherein the images are generated by tracing the path of light rays associated with the image. Some of these ray tracing operations employ a tree structure, such as a bounding volume hierarchy (BVH) tree, to represent a set of geometric objects within a scene to be rendered. The geometric objects (e.g., triangles or other primitives) are enclosed in bounding boxes or other bounding volumes that form leaf nodes of the tree structure, and then these nodes are grouped into small sets, with each set enclosed in their own bounding volumes that are represented by a parent node on the tree structure, and these small sets then are bound into larger sets that are likewise enclosed in their own bounding volumes that represent a higher parent node on the tree structure, and so forth, until there is a single bounding volume representing the top node of the tree structure and which encompasses all lower-level bounding volumes.

To perform some ray tracing operations, the tree structure then is used to identify potential intersections between generated rays and the geometric objects in the scene by traversing the nodes of the tree, where at each node being traversed a ray of interest is compared with the bounding volume of that node to determine if there is an intersection, and if so, continuing on to a next node in the tree, where the next node is identified based on the traversal algorithm, and so forth. However, conventional approaches to traversing the tree structure sometimes consume a relatively high amount of system resources, or require a relatively large amount of time, thus limiting the overall quality of the resulting images.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for employing a hardware traversal engine at a processing unit to traverse an acceleration structure such as a ray tracing structure. The hardware traversal engine includes one or more memory modules to store state information and other data used for the structure traversal, and control logic to execute a traversal process based on the stored data and based on received information indicating a source node of the acceleration structure to be used for the traversal process. By employing a hardware traversal engine, the processing unit is able to execute the traversal process more quickly and efficiently, conserving processing resources and improving overall processing efficiency.

To illustrate, a conventional GPU employs a software shader, executing at a shader processor to control ray tracing operations. To implement BVH traversal (that is, traversal of a BVH tree) for ray tracing, the GPU employs a loop wherein the shader provides a ray address and a BVH node address to texture addressing hardware of the GPU, the texture address hardware provides the corresponding ray and BVH node to an intersection engine to identify any intersection between the ray and the BVH node, and the intersection result is returned to the shader to determine the next node of the BVH tree to be processed. Thus, the shader initiates each iteration of the tree traversal process, thereby adding overhead for each iteration.

In contrast to the conventional approach, using the techniques described herein a GPU is able to employ a hardware traversal engine that initiates at least some of iterations of the tree traversal process, thereby reducing the overall overhead associated with tree traversal. For example, in some embodiments the traversal engine is configured to receive the intersection information from the intersection engine and, based on the intersection information identify the next step in the traversal process including, in some cases, continuing the tree traversal by sending the next ray-node intersection to the texture addressing hardware. Thus, for these iterations of tree traversal, the shader is removed from the traversal process, lowering the overhead associated with the traversal process. In other cases, the traversal engine returns the ray-node intersection information to the shader to execute a specified operation (e.g., an any hit shader). Upon completion of the operation, the shader instructs the traversal engine to resume the tree traversal process, using traversal state information stored at the traversal engine itself. Thus, using the techniques described herein, the control flow of the tree traversal process is offloaded from the shader to the traversal engine hardware, improving overall processing efficiency.

In some embodiments, the traversal engine includes a plurality of memory modules to store data used for the traversal process. The traversal engine is thus able to execute operations quickly, and further reduces the impact of the traversal process on the memory access traffic at the processing unit, such as by reducing the number of accesses to a cache or local data store of the processing unit. In some embodiments, examples of these memory modules include an initial data store configured to store data extracted from an initial ray tracing call, a top level acceleration structure (TLAS) data store configured to store data for the ray in TLAS coordinate space, a bottom level acceleration structure (BLAS) data store configured to store data for the ray in BLAS coordinate space, a traversal state memory configured to store temporary data associated with the current iteration of the traversal process, a closest hit memory configured to store the closest hit value for the ray in the tree structure, and a traversal stack configured to store a stack of node addresses for the current ray for the ray to intersect next.

For purposes of description, FIGS. 1-5 are described with respect to examples wherein a traversal engine is implemented at a GPU and performs a traversal process to traverse a BVH tree. However, it will be appreciated that, in other embodiments, the techniques described herein are implemented at different types of processing units, are implemented to traverse a different type of acceleration structure, or any combination thereof.

Figure 1:
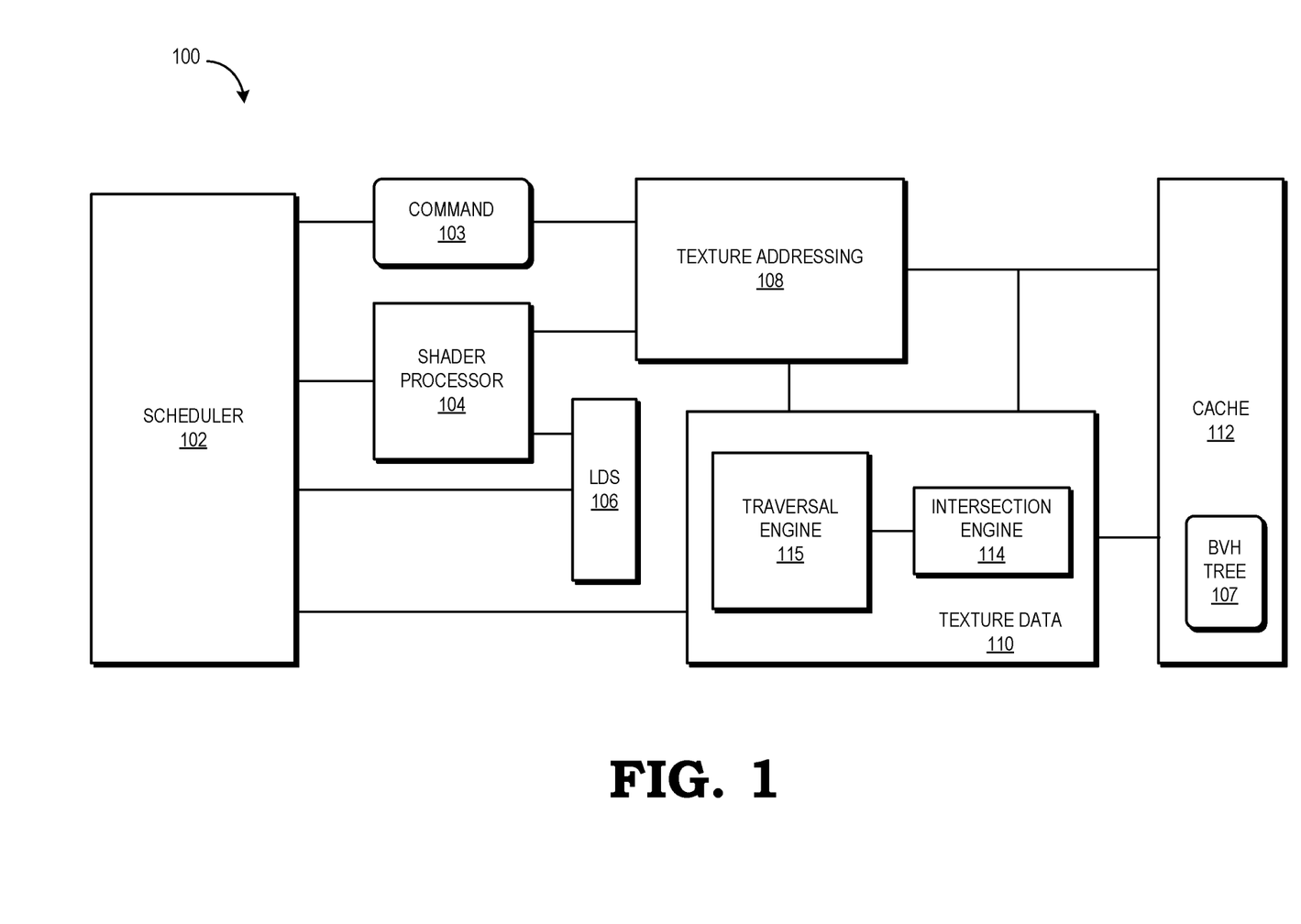
FIG. 1 is a block diagram of a graphics processing unit (GPU) that employs a hardware traversal engine to traverse a ray tracing structure in accordance with some embodiments.

FIG. 1 illustrates a block diagram of a GPU 100 generally configured to perform ray tracing and other graphical operations on behalf of a processing system in accordance with some embodiments. The processing system is generally configured to execute sets of instructions (e.g., computer programs) to perform specified tasks on behalf of an electronic device. Accordingly, in different embodiments, the GPU 100 is incorporated into any one of a number of electronic devices, such as a desktop computer, laptop computer, server, smartphone, tablet, game console, and the like.

The GPU 100 is configured to receive commands (e.g., draw commands) from another processing unit (not shown) of the processing system, to generate one or more commands based on the received commands, and to execute the generated commands by performing one or more graphical operations. At least some of those generated commands require texture operations, including ray tracing operations. To facilitate execution of the texture operations, the GPU 100 includes a scheduler 102, a shader processor 104, a local data store 106, a texture addressing (TA) module 108, a texture data (TD) module 110, and a cache 112.

The scheduler 102 is generally configured to schedule, or sequence, commands (e.g., command 103) for execution at the various modules of the GPU 100, including the TA module 108, the shader processor 104, and the LDS 106. In at least some embodiments, the scheduler 102 is configured to receive the commands for scheduling from one or more of these same modules, or from another module of the GPU 100, such as from a command processor (not shown).

The shader processor 104 includes one or more processing elements that are collectively configured to execute shading operations based on commands received from the scheduler 102. Examples of these shading operations include execution of material shaders, tessellation shaders, hull shaders, vertex shaders, ray tracing shaders, and the like. In the course of executing these shading operations, in at least some cases the shader processor generates data for provision to other modules of the GPU 100 and commands for provision to the scheduler 102.

The LDS 106 is a memory generally configured to store data that is shared between operations executing at the GPU 100. For example, in some embodiments the LDS 106 stores data that is shared between threadgroups executing at the GPU 100.

The cache 112 is a memory configured to stored cached data used for operations at the GPU 100, including ray tracing and other texture operations. In the depicted embodiment, the cache 112 stores a BVH tree 107 (referred to hereinafter as BVH 107) that is employed by the GPU 100 to implement ray tracing operations. The BVH 107 includes a plurality of nodes organized as a tree, with bounding boxes or other bounding volumes that forming leaf nodes of the tree structure, and then these nodes are grouped into small sets, with each set enclosed in their own bounding volumes that represent a parent node on the tree structure, and these small sets then are bound into larger sets that are likewise enclosed in their own bounding volumes that represent a higher parent node on the tree structure, and so forth, until there is a single bounding volume representing the top node of the BVH 107 and which encompasses all lower-level bounding volumes.

The TA module 108 is generally configured to perform addressing tasks associated with texture operations, including ray tracing operations, based on commands received from the scheduler 102. For example, in some embodiments, the TA module 108 receives ray tracing commands indicating particular data to be used for ray tracing, such as ray data and BVH node data. The TA module 108 identifies the memory addresses associated with the data and provides the memory addresses to the cache 112 for retrieval of the ray tracing data, The TA module 108 then provides the ray tracing data to the TD module 110.

The TD module 110 includes one or more circuits collectively configured to execute ray tracing and other texture operations based on data received from the TA module 108. In particular, the TD module 110 is configured to perform intersection operations, to identify whether a given ray intersects with a given BVH node, and traversal operations, to traverse the BVH 107 based on the intersection operations. To facilitate these operations, the TD 110 includes an intersection engine 114 and a traversal engine (TE) 115.

The intersection engine 114 is configured to receive ray data, identifying a particular ray to be used for ray tracing, and node data, indicating a node of the BVH tree 107. The intersection engine 114 executes a node intersection process to identify whether the ray intersects with the node (referred to as an intersection hit) or does not intersect with the node (referred to as an intersection miss). The intersection engine 114 provides the intersection miss and intersection hit data, along with ray data and BVH node data, to the TE 115.

The TE 115 is a hardware engine including one or more circuits that are collectively configured to perform tree traversal operations. In particular the TE 115 is configured to receive the intersection information (hit data, miss data, ray data, and BVH node data) from the intersection engine 114. Based on the intersection information, the TE 115 executes a traversal process. For example, in some embodiments, the TE implements a stack-based depth-first BVH traversal process, wherein a traversal stack is used to store addresses of next nodes for ray to intersect. Tree nodes are visited in depth-first order and, for every intersected interior node, the intersected child nodes are sorted based on their distance to ray origin. The furthest nodes are pushed onto stack, and the closest node is used as the next intersect for the next iteration of the traversal loop. In some embodiments, the traversal loop is implemented using a state machine, so that the TE 115 is able to process different rays per sequential clock cycles. In other embodiments, the TE implements a stackless traversal process, a while-while traversal process, and the like. In some embodiments, according to the traversal process, the TE 115 identifies one of three possible outcomes: 1) a next node of the BVH 107 to be tested for intersection with a ray; 2) a shader to be executed (e.g., an any-hit shader); or 3) an end of the tree traversal process for the current ray.

Figure 2:
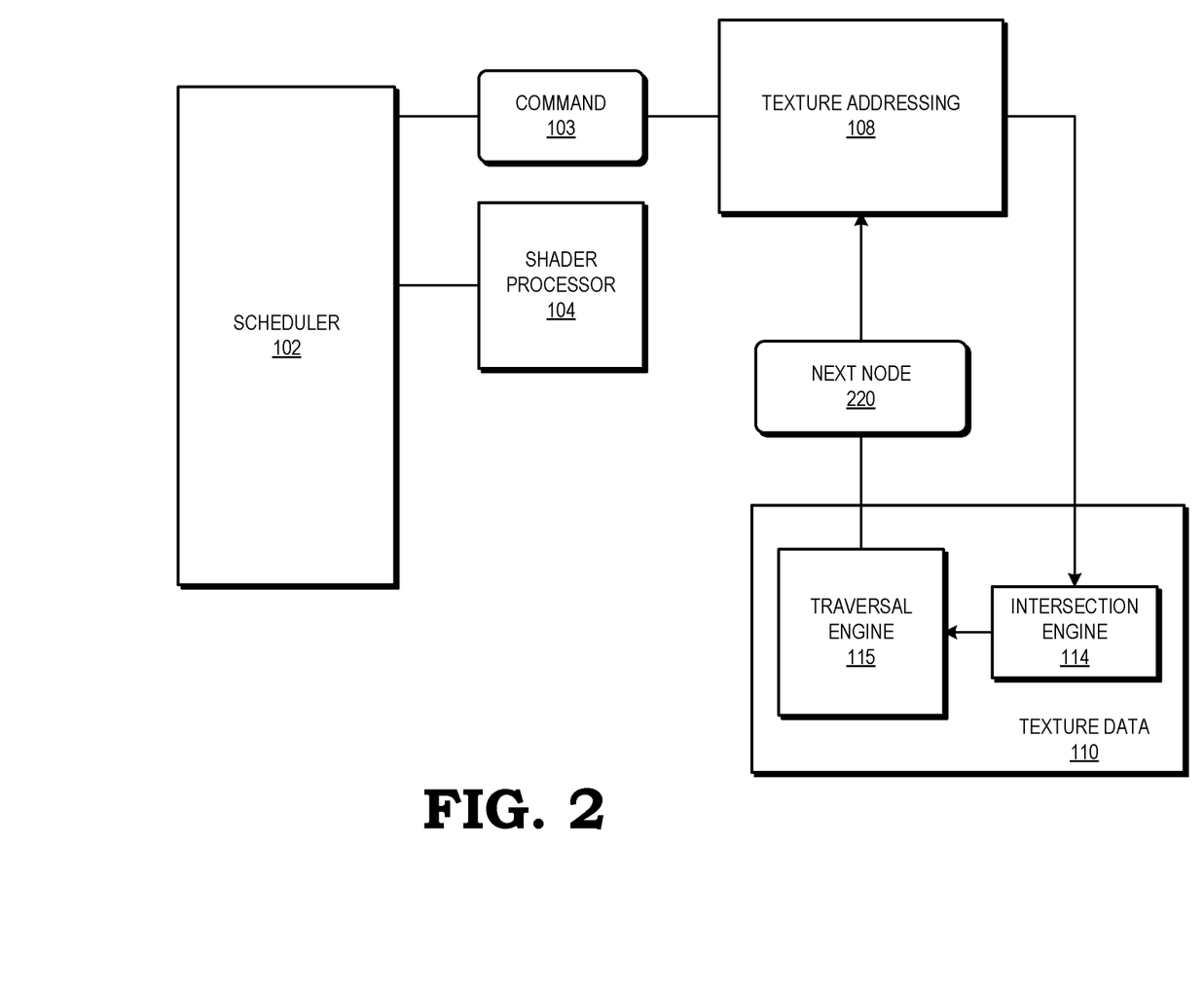
FIG. 2 is a block diagram of the traversal engine of FIG. 1 looping an identified node of the ray tracing structure to texture hardware of the GPU in accordance with some embodiments.

In response to identifying a next node of the BVH 107 to be tested, the TE 115 provides address information for the next node to the TA 108. An example is illustrated at FIG. 2 in accordance with some embodiments. In the depicted example, the TA receives the command 103 to initiate traversal of the BVH 107. In response, the TA 108 provides ray and node address information to the intersection engine 114, which retrieves the corresponding ray and node data from the cache 112. Using the ray and node data, the intersection engine 114 determines intersection information for the ray and node and provides the intersection information to the TE 115. Based on the intersection information, and according to the tree traversal process, the TE 115 determines a next node 220, representing the next node of the BVH 107 to be tested for intersection with the ray.

The TE 115 provides address information for the next node 220 directly to the TA block 108, and also provides any metadata needed for traversal, such as ray identifiers. In response, the TA 108 sends a request for the node data for the next node 220 to the cache 112 and sends the next node address and other parameters to the to the intersection engine 114, which determines intersection information based on the next node 220 and the ray data provided by the cache 112. Thus, in the example of FIG. 2, the TE loops the next node 220 directly to the TA 108, triggering the next iteration of the traversal process and bypassing both the scheduler 102 and the shader processor 104. The overhead associated with the next iteration of the traversal process is thereby reduced, improving the overall efficiency of the traversal process.

Returning to FIG. 1, in some cases, for some iterations of the traversal process the TE 115 identifies that a shader is to be executed for the current node of the BVH 107 and the current ray. Examples of shaders to be executed include any hit shaders, procedural shaders, and the like. In response, the TE 115 provides a command to the scheduler 102 to trigger execution of the identified shader. In some embodiments, the TE 115 provides a shader type to the shader processor 104, which determines the address of the shader function to call. An example is illustrated at FIG. 3 in accordance with some embodiments.

Figure 3:
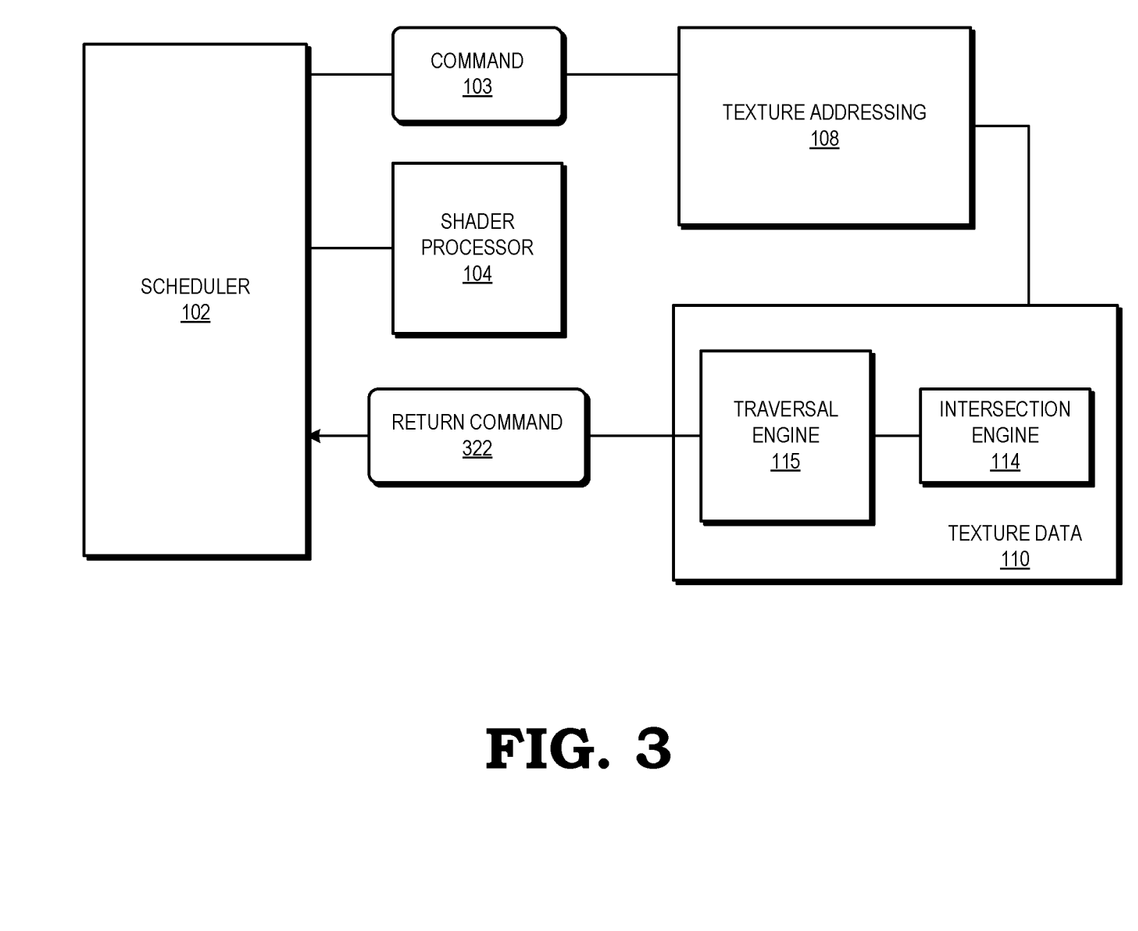
FIG. 3 is a block diagram of the traversal engine of FIG. 1 providing a shader command to a scheduler of the GPU in accordance with some embodiments.

In the example of FIG. 3, the TA receives the command 103 to initiate traversal of the BVH 107. As with the example of FIG. 2, in response to the command 103 the TA 108 provides ray and node address information to the intersection engine 114, which retrieves the corresponding ray and node data from the cache 112. Using the ray and node data, the intersection engine 114 determines intersection information for the ray and node and provides the intersection information to the TE 115. Based on the intersection information, and according to the tree traversal process, the TE 115 determines a return command 322, representing a command to execute a particular shader. The TE 115 provides the return command 322 to the scheduler 102, which schedules the command at the shader processor 104 for execution.

In some embodiments, in conjunction with issuing the return command 322, the TE 115 saves, at a local data store, state information indicating the current state of the traversal process. Upon completion of the shader indicated by the return command 322, the shader processor 104 issues, via the scheduler 102 a command to the TE 115 to resume the traversal process. In response to the resume command, the TE 115 loads the stored state data and resumes traversal of the BVH 107.

Returning to FIG. 1, at a given point in the traversal process, the TE 115 determines that traversal of the BVH 107 is complete. In response, the TE 115 returns data, such as hit data (which node was hit (if any), the distance from the ray origin, the BVH node address, data flags, bookkeeping data (e.g., memory data), and any BVH information required by the shader processor 104, such as by storing the BVH information at the LDS 106. The shader processor 104 employs this information to, for example, initiate further ray tracing operations, such as initiating traversal of the BVH 107 based on another ray.

Figure 4:
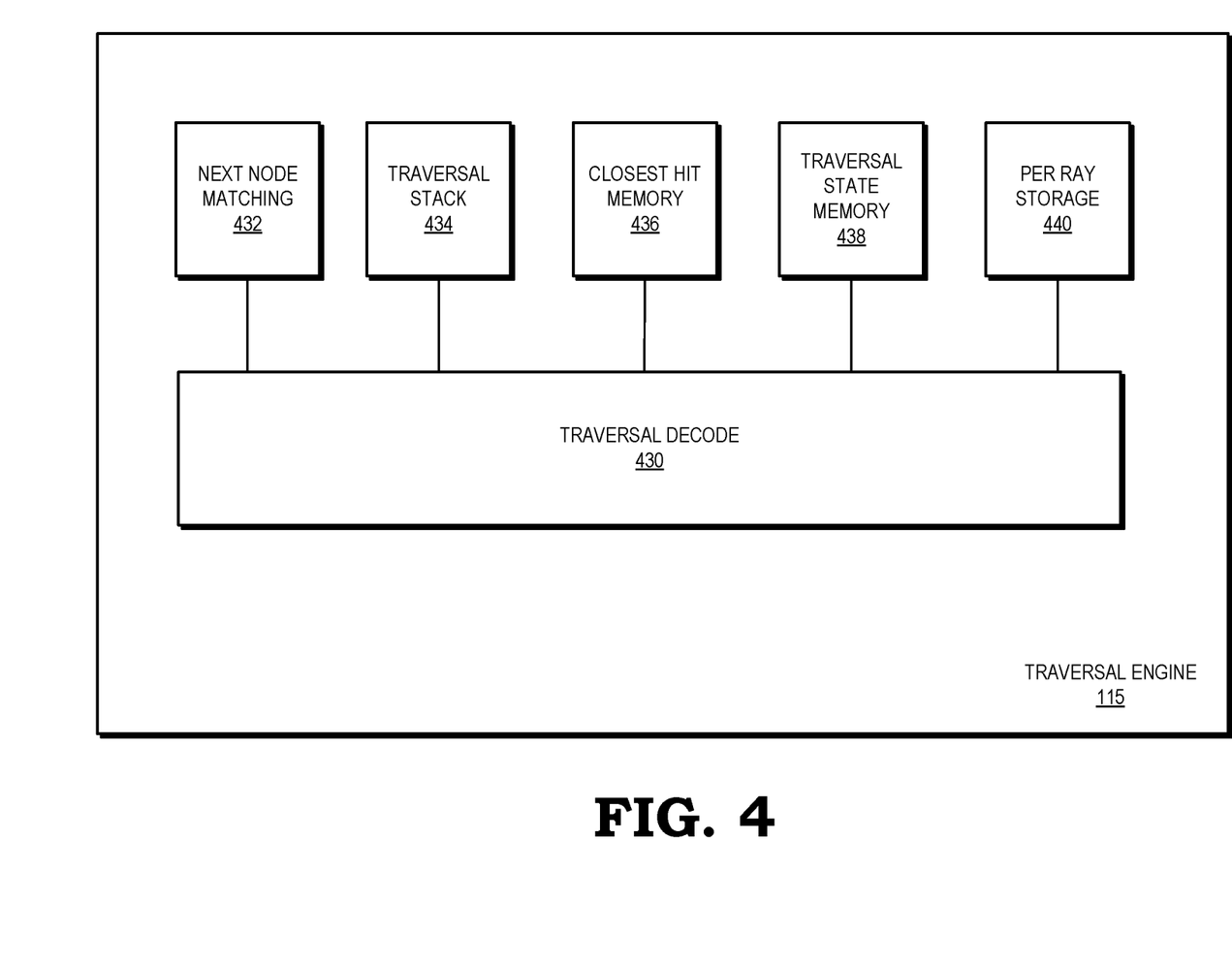
FIG. 4 is a block diagram of the traversal engine of FIG. 1 in accordance with some embodiments.

FIG. 4 illustrates a block diagram of the TE 115 in accordance with some embodiments. In the depicted example, the TE 115 includes a traversal decode module 430 and a plurality of memory structures, including a traversal stack 434, a closest hit memory 436, a traversal state memory 438 and a per ray storage memory 440. The TE 115 also includes a next node matching module 432.

The traversal decode module 430 is a set of circuits that are collectively configured to implement, in hardware, the traversal process for a BVH (e.g., the BVH 107). In some embodiments, the traversal decode module 430 is configured as a state machine that implements the traversal process, including an initial state and one or more result states (states that cause the traversal decode module 430 to generate a result to be provided to the TA module 108, the scheduler 102, or other module). The intersection engine 114 provides to the traversal decode module 430 intersection results, wherein each intersection result includes intersection data for a particular ray and particular BVH node. In response to receiving the intersection data, the traversal engine 115 places a traversal state for the corresponding intersection result in the initial state. Based on the intersection data and the node of the BVH tree 107, the traversal decode engine 430 changes the state for the intersection result until the result reaches one or more specified final states, such as a result state. As the intersection result proceeds through the different states of the state machine, the traversal decode engine 430 generates and provides any output information indicated by the states of the intersection result, including generating a next node 220, a return command 322, and the like. In some embodiments, the traversal decode module 430 is clocked by a specified clock signal, and the state for an intersection result is set by the traversal decode module 430 for each cycle of the clock signal. Further, in some embodiments, the traversal decode module 430 is configured as a pipeline, wherein the traversal decode module 430 concurrently processes multiple intersection results, for different rays, different BVH nodes, or both.

The next node matching module 432 is configured to receive BVH node information from the traversal decode module 430. Based on the received BVH node information, the next node matching module 432 improves cache utilization when fetching BVH node data, when subsequent rays aim to intersect against the same BVH node. In some embodiments, The next node matching module 432 groups rays provided by the traversal decode module 430 based on their next node address. The next node matching module 432 then reorders rays sent for next traversal iteration (intersection) based on their next node request. For example, in the case of a ray at the end of traversal decode block, if the ray needs a node address the TE 115 has just sent to the TA 108, the TE 115 sends the ray id around the loop without enqueuing any memory fetches for the cache 112. This allows the cache 112 to be used by non-traversal for this cycle. If the ray needs a different node address, the TE 115 adds it into a queue (not shown) that corresponds to its node address, and sends a different ray for intersection that matches the node address that was requested at previous cycle. If that queue is empty, the TE selects another queue to request for intersection.

The traversal stack 434 includes a traversal stack for each ray being processed by the traversal decode module 430. In at least some embodiments, the number of entries assigned to a given ray at the traversal stack 434 is a programmable value. Depending on the state of the ray intersection data at the traversal decode module 430, the traversal decode module either writes elements to the stack for the ray or reads elements from the stack for the ray. The traversal stack 434 thus enables the traversal decode module 430 to implement recursive traversal processes using an iterative process.

The closest hit memory 436 stores the closest hit value for each ray being processed at the traversal decode module 430. The closest hit memory 436 is initialized to a specified maximum distance value and, as the traversal decode module 430 processes intersection data for a given ray and finds new intersections, or hits, with nodes of the BVH tree 107, the traversal decode module 430 updates the closest hit memory 436 to reflect the minimum ray hit distance for the ray relative to nodes of the BVH 107. In some embodiments, the minimum ray hit distance for the ray is returned to the shader processor 104 in response to the ray completing traversal of the BVH 107.

The traversal state memory 438 is configured to store temporary data associated with the traversal process. The temporary data is employed by the traversal decode module 430 to determine the current traversal state for an individual ray, and therefore to determine the next state for the ray based on intersection information provided by the intersection engine 114. Examples of the temporary information include the current node of the BVH tree 107 associated with the ray, the previous node of the BVH tree 107 associated with the ray, pointer information for the traversal stack 434, TLAS and BLAS information to indicate the level of the BVH tree 107 being used for traversal, and the like.

The per ray storage memory 440 stores ray definition data for the rays being processed at the traversal decode engine 430. In some embodiments, the per ray storage memory 440 stores BLAS definition for the ray, and a separate data store (not shown) at the TD module 110 stores TLAS definition data for use by the intersection engine 114.

Figure 5:
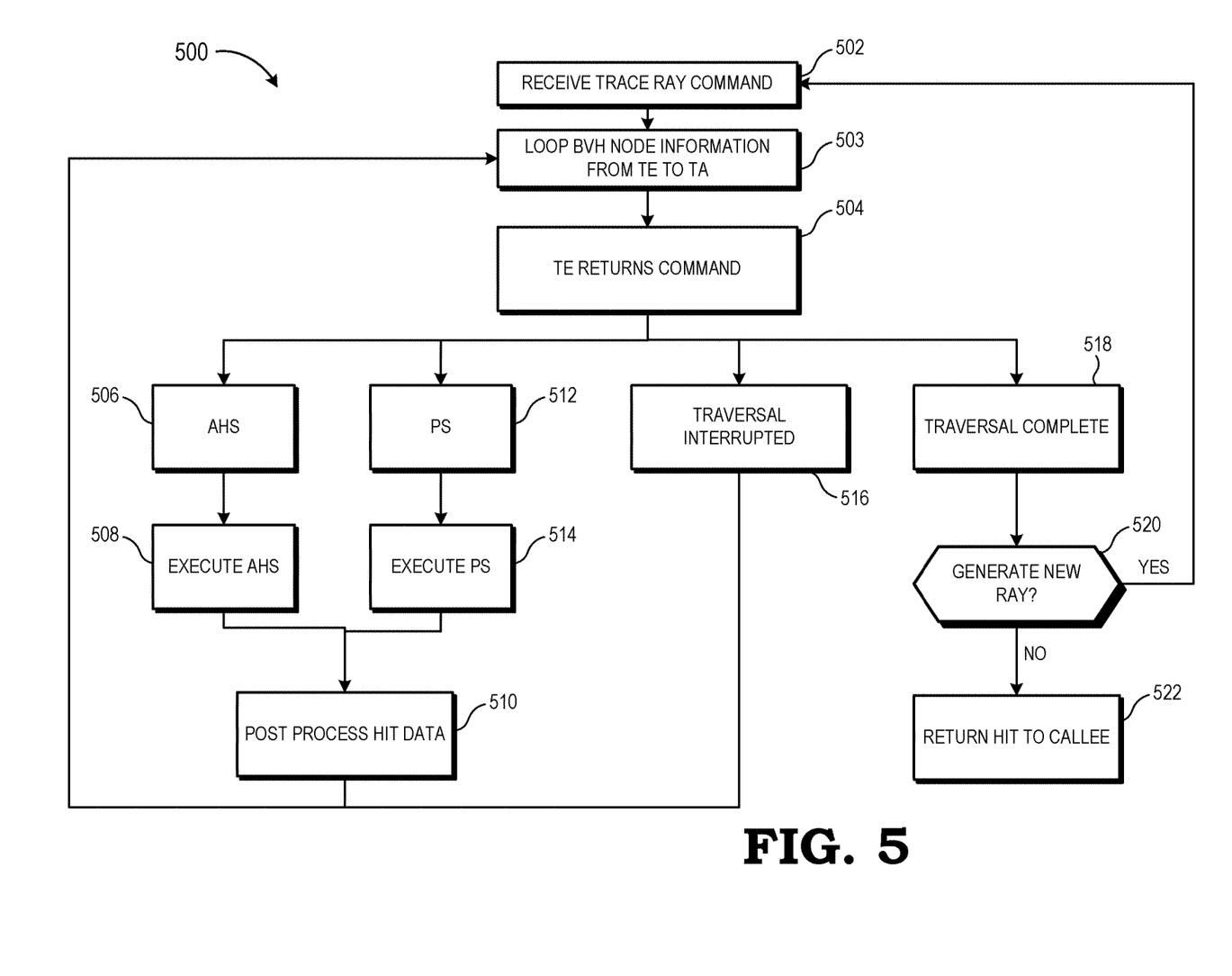
FIG. 5 is a flow diagram of a method of traversing a ray tracing structure with a hardware traversal engine in accordance with some embodiments.

FIG. 5 illustrates a method 500 of employing a hardware traversal engine to traverse an acceleration structure in accordance with some embodiments. The method 500 is described with respect to an example implementation at the GPU 100 of FIG. 1, but it will be appreciated that in other embodiments the techniques reflected by the method 500 are implemented in other types of processing units, or at processing units having a different configuration.

At block 502, the TA 108 receives a trace ray command from the scheduler 102, indicating a ray that is to traverse the BVH 107. In response, the TA 108 generates address information for the ray and for an initial node of the BVH 107. Based on this address information, the cache 112 provides ray data and BVH node data to the intersection engine 114. In response, the intersection engine 114 generates intersection data based on the ray data and the node data. Based on the intersection data, the TE 115 identifies the next node 220 of the BVH 107. At block 503, the TE 115 provides the next node 220 to the TA module 108, which generates address information for the next node. Based on the address information, the cache 112 provides data for the next node 220 to the intersection engine 114, which in turn generates intersection data for the next node and the current ray. Thus, the traversal engine 115 loops the next node 220 directly to the TA module 108, bypassing the scheduler 102 and the shader processor 104, thereby improving the speed and efficiency of the BVH traversal process.

As the TE 115 traverses the BVH 107, at block 504 the TE 115 returns a command to the scheduler 102. In response, the scheduler 102 schedules the command for execution at the shader processor 104. The particular command returned by the TE 115 depends on the current node of the BVH 107 being processed, and in different cases is an any hit shader (AHS) command (block 506), a procedural shader (PS) command (block 512), a traversal interrupted command (block 516), and a traversal complete command (block 518). Each of these commands is discussed below.

At block 506, the TE 115 returns an AHS command. In response, at block 508, the shader processor 104 executes the AHS indicated by the AHS command. At block 510, the shader processor 104 post processes the BVH hit data generated by the TE 115. The shader processor 104 then generates a BVH traversal continue command, and in response the method flow returns to block 503 and the TE 115 continues traversing the BVH 107. In some embodiments, the continue command terminates the traversal, Such as when the AHS accepts a hit and determines that traversal should stop.

At block 512, the TE 115 returns a PS command. In response, at block 514, the shader processor 104 executes the PS indicated by the PS command. At block 510, the shader processor 104 post processes the BVH hit data generated by the TE 115. The shader processor 104 then generates a BVH traversal continue command, and in response the method flow returns to block 503 and the TE 115 continues traversing the BVH 107. In some embodiments, the continue command terminates the traversal At block 516, the TE 115 returns a traversal interrupted command to indicate that traversal of the BVH 107 was interrupted. In response, the shader processor 104 generates a BVH traversal continue command, and in response the method flow returns to block 503 and the TE 115 continues traversing the BVH 107.

At block 518, the TE 115 returns a traversal complete command to indicate that traversal of the BVH 107 for a given ray is complete. The TE 115 indicates, via the traversal complete command, either the closest hit node of the BVH 107 (as stored at the closest hit memory 436) or an indication that the ray missed the nodes of the BVH 107. In response, the shader processor 104 determines if another ray is to be traced and if so, the method flow returns to block 502 and the shader processor 104 issues a new ray trace command for the new ray. If not, the method flow moves to block 522, and the shader processor 104 returns hit data (that is data indicating the nodes of the BVH 107 that have been intersected by rays), and other data such has hit distance from ray origin, barycentric information, and the like to the thread or process that requested the ray tracing.

It will be appreciated that the method 500 is only an example of employing the TE 115 to assist in ray tracing, and that in other embodiments the TE 115 is employed in other ways. For example, in some embodiments, hits at the BVH 107 are processed within the shader itself (that is, processed at the shader processor 104) without returning the hit data to the callee. In these embodiments the TE does not return any traversal interrupted command but instead traverses all rays associated with a given wavefront until a BVH hit is found or traversal of the BVH 107 is complete.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit, comprising:
a scheduler to schedule commands for execution at modules of the processing unit; and
a hardware traversal engine configured to traverse a ray tracing structure in response to a first command from the scheduler, the hardware traversal engine configured to, in response to identifying a node of the ray tracing structure to be tested, provide address information of the node of the ray tracing structure to be tested to a texture addressing module such that the scheduler is bypassed.

2. The processing unit of claim 1 further comprising:
a shader processor to execute shading operations; and
wherein the hardware traversal engine is configured to bypass the shader processor in response to identifying the node of the ray tracing structure to be tested by providing the addresses information of the node of the ray tracing structure to be tested to the texture addressing module.

3. The processing unit of claim 1, wherein
the texture addressing module is configured to identify address information for the ray tracing structure in response to a first command from the scheduler.

4. The processing unit of claim 1, wherein:
the hardware traversal engine is configured to return a command to the scheduler in response to identifying a second node of the ray tracing structure to be tested.

5. The processing unit of claim 4, wherein:
the command comprises a command to execute a specified shader at a shader processor of the processing unit.

6. The processing unit of claim 5, wherein the specified shader is an any hit shader.

7. The processing unit of claim 1, wherein the ray tracing structure comprises a bounding volume hierarchy (BVH).

8. A system comprising:
a scheduler configured to provide a ray tracing command;
a memory configured to store ray tracing data for a ray tracing structure; and
a hardware traversal engine configured to traverse, in response to the ray tracing command, the ray tracing structure, wherein traversing the ray tracing structure comprises providing address information of at least one node of the ray tracing structure to be tested to a texture addressing module such that the scheduler is bypassed.

9. The system of claim 8, wherein:
the hardware traversal engine comprises a traversal stack memory to store the address information of the at least one node of the ray tracing structure to be tested.

10. The system of claim 8, wherein:
the hardware traversal engine includes a closest hit memory to store information indicating the closest node of the ray tracing structure relative to a ray associated with the ray tracing command.

11. The system of claim 8, wherein:
the hardware traversal engine includes a traversal state memory to store state information for a ray associated with the ray tracing command.

12. The system of claim 8, further comprising: a shader processor; and
wherein traversing the ray tracing structure comprises providing the address information of the at least one node of the ray tracing structure to be tested to the texture addressing module such that the shader processor is bypassed.

13. A method, comprising:
scheduling, at a scheduler of a processing unit, commands for execution at modules of the processing unit; and
traversing, at a hardware traversal engine of the processing unit, a ray tracing structure in response to a first command from the scheduler, the hardware traversal engine configured to, in response to identifying a first node of the ray tracing structure to be tested, provide address information of the node of the ray tracing structure to be tested to a texture addressing module such that the scheduler is bypassed.

14. The method of claim 13, further comprising:
providing, by the hardware traversal engine, the address information of the node of the ray tracing structure to be tested to the texture addressing module such that a shader processor of the processing unit is bypassed.

15. The method of claim 13, further comprising:
identifying, at the texture addressing module of the processing unit, address information for the ray tracing structure in response to the first command.

16. The method of claim 13, further comprising:
returning, from the hardware traversal engine, a command to the scheduler in response to identifying a second node of the ray tracing structure to be tested.

17. The method of claim 16, wherein:
the command comprises a command to execute a specified shader at a shader processor of the processing unit.

18. The method of claim 13, wherein the ray tracing structure comprises a bounding volume hierarchy (BVH).

* * * * *